No. 772,075.
PATENTED OCT. 11, 1904.
M. F. WIEDEMANN.
JOURNAL BEARING.
APPLICATION FILED NOV. 21, 1903.
NO MODEL.
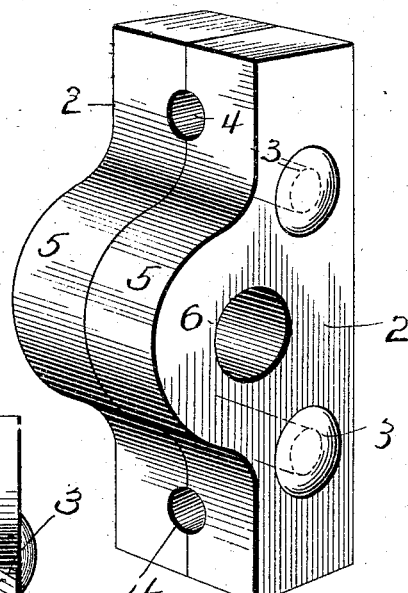
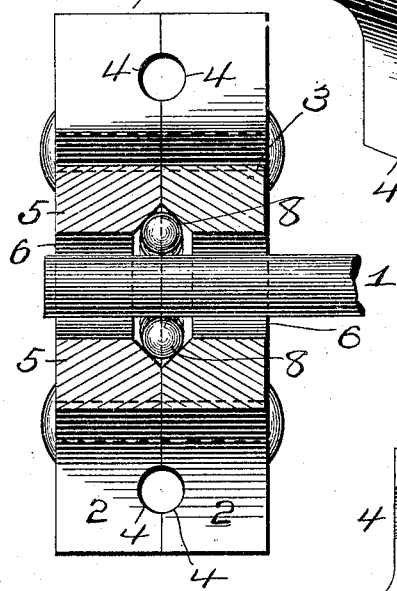
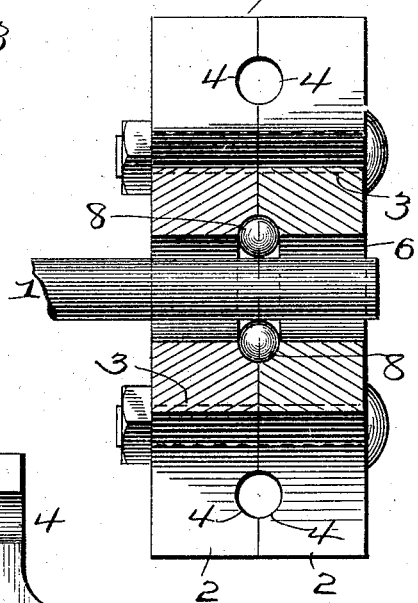
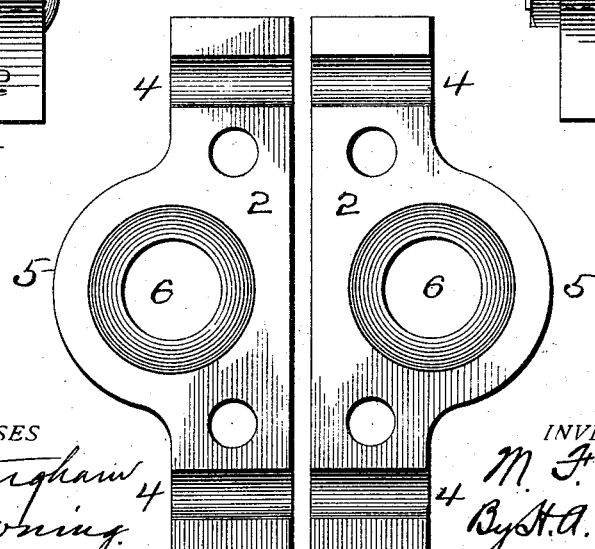
WITNESSES
E. J. Nottingham
G. F. Downing
INVENTOR
M. F. Wiedemann
By H. A. Seymour
Attorney No. 772,075. Patented October 11, 1904.

UNITED STATES PATENT OFFICE.

MARTIN F. WIEDEMANN, OF BURLINGTON, IOWA.

JOURNAL-BEARING.

SPECIFICATION forming part of Letters Patent No. 772,075, dated October 11, 1904.

Application filed November 21, 1903. Serial No. 182,178. (No model.)

*To all whom it may concern:*

Be it known that I, MARTIN F. WIEDEMANN, a resident of Burlington, in the county of Des Moines and State of Iowa, have invented certain new and useful Improvements in Journal-Bearings; and I do hereby declare the following to be a full, clear, and exact description of the invention, such as will enable others skilled in the art to which it appertains to make and use the same.

My invention relates to an improved journal-bearing, and more particularly to improvements of this character especially adapted for use as a bearing for the journal or trunnion at the end of an awning-roller, the object of the invention being to provide an improved bearing composed of two members easily secured together and to a wall or other support and form an improved runway for balls contacting with the journal, and, further, to provide an improved bearing which will be extremely simple in construction, cheap to manufacture, and strong and durable.

With these objects in view the invention consists in certain novel features of construction and combinations and arrangements of parts, as will be more fully hereinafter described, and pointed out in the claim.

In the accompanying drawings, Figure 1 is a perspective view illustrating my improvements. Fig. 2 is a view in section. Fig. 3 illustrates the two members of the bearing separated, and Fig. 4 is a view in section illustrating a modified form of runway.

1 represents the journal or trunnion, for example, at the end of an awning-roller, and 2 2 the members of my improved bearing, which are made precisely alike and can be cast from the same mold or pattern, if desired. These members 2 2 have flat faces to fit snugly against each other, are made with alined openings to receive rivets or other locking devices 3 to secure them together, and are made with semicylindrical recesses 4 in their adjacent faces near their ends, which recesses when together form cylindrical openings to receive bolts, screws, nails, or like devices to secure the bearing to a wall or other support. The central portions of the members 2 2 are made with curved enlargements 5, having alined openings 6 to receive the journal 1 and permit the latter free rotation therein without contact therewith. Around the openings 6 the adjacent faces of the members are beveled or recessed, as shown, forming when the members are together a V-shaped annular groove or runway for balls 8, surrounding journal 1, and it will be observed that by so constructing the runway the balls have but a narrow contact with the members and also with the journal, thus greatly reducing friction and making extremely easy the rotation of the journal.

In Fig. 4 a modified form of groove or runway is illustrated—namely, one of a general concave formation—and other changes might be made in the general form and arrangement of the several parts described without departing from my invention. Hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

A bearing of the character described, comprising two blocks disposed face to face and having cooperating grooves for the passage of fastening devices for securing the bearing in place, bolts passing through said blocks and securing them together, said blocks having alined openings for the reception of a journal, each block beveled on its inner face around said openings, said beveled portions cooperating to form a runway and balls mounted to run on said runway.

In testimony whereof I have signed this specification in the presence of two subscribing witnesses.

MARTIN F. WIEDEMANN.

Witnesses:
CHAS. C. CLARK,
MARY FAWCETT.